Patented Dec. 30, 1952

2,623,900

UNITED STATES PATENT OFFICE 2,623,900

METHOD FOR THE PREPARATION OF POLYETHER ACETIC ACIDS

Kurt Hofer, Basel, Switzerland, assignor to Sandoz A. G., Basel, Switzerland, a Swiss firm No Drawing. Application August 29, 1949, Serial No. 113,023. In Switzerland September 1, 1948

5 Claims. (Cl. 260—521)

According to the conventional art, compounds containing ether groups are produced by interaction of the corresponding alkali metal alcoholates with esters of inorganic acids, for instance according to the following equation: R—O alkali metal+halogen—R'=R—O—R'+alkali metal halide.

The alcoholates which are necessary to this effect may be obtained from alcohols by the action of alkali metals. High-molecular alcohols hardly react with alkali metals and there is, therefore, often an alcoholate of a lower alcohol produced first which is subsequently caused to react with the high-molecular alcohol. Methods have also become known according to which the anhydrous alcoholates are obtained from alcohols by interaction with alkali metal hydroxides under the action of heat, while removing the water of the reaction in a suitable way, e. g. by azeotropic distillation (cf. German Patent 519,443). This procedure requires a large plant, an auxiliary liquid for removing the water, a rather large excess of alcohol, a great deal of heat and often gives rise to undesired side-reactions (like formation of the corresponding carboxylic acid salts by dehydrogenation). The side-reactions render this method unsuitable for the preparation of alcoholates of high molecular alcohols (for example fatty alcohols) and ether alcohols from the same. So far the same methods have been adopted for the production of polyether compounds, and more particularly for polyether acetic acids, as for preparing compounds containing only one ether group in the molecule (cf. for instance Palomaa, B 70,2199). The ether alcohols used as starting materials can mostly react only with difficulty with alkali metals and the method with alkali metal hydroxide, with removal of the water by azeotropic distillation, very easily causes side-reactions and cannot be carried out at all with high molecular ether alcohols.

A simple method has now been found for preparing polyether acetic acids, salts thereof or functional derivatives of the same, that is to say compounds containing at least two ether-like bonded oxygen atoms in the molecule.

According to the present invention the said compounds are obtained by causing an alkali metal hydroxide-addition compound of an ether alcohol of the general formula

R—O—A—OH wherein R represents an alkyl, cycloalkyl, aralkyl, aryl or heterocyclic radical which may be interrupted by hetero atoms or hetero atom groups, which radical can also be substituted in any way, but in particular by hydroxyl groups and A represents an alkylene radical containing 2 to 4 carbon atoms wherein R—O—A can also be part of a ring system, to react with a monohaloacetic acid, a salt or a functional derivative of the same The following compounds can suitably be used according to this invention as ether alcohols: Alkyl, cycloalkyl, aralkyl, aryl and aralkylglycol and polyglycol ethers, such as methyl, ethyl, propyl, butyl, amyl, hexyl, heptyl, octyl, nonyl, decyl, undecyl, dodecyl, octadecyl, cyclohexyl, methylcyclohexyl, benzyl, phenyl-ethyl, phenyl, amylphenyl, octylphenylglycol and polyglycol, ethers, polyethylene glycols, polypropylene glycols, polyglycerols, glycerol mono- and diether or tetrahydrofurfuryl alcohol.

The alkali metal hydroxide-addition compounds of the ether alcohols are formed on mixing the alkali metal hydroxide, particularly sodium and potassium hydroxide, with the ether alcohols with evolution of heat. These addition compounds react very easily with monohaloacetic acid or its salts and its functional derivatives respectively and this often already at room temperature or at an only slightly elevated temperature. In the known etherifying methods the alcohol or ether alcohol must be used in large excess or a suitable diluent will be necessary. In the process of the present invention the excess of ether alcohol may be very small and is not necessary in many cases.

The new process has the following advantages over the methods which have hitherto become known:

(1) Simplicity of execution and plant
(2) No side-reactions and thus increased purity of the products
(3) High yields
(4) No or only an insignificant consumption of energy
(5) Simple method for etherifying high molecular ether alcohols for which the processes which have hitherto been known cannot be employed or only hardly so The following examples, without being limitative, illustrate the present invention.

*Example 1.—2-ethylbutoxy-ethoxy-acetic acid*

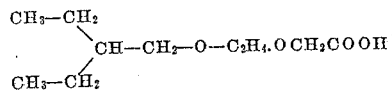

To 600 grams of 2-ethylbutylglycol ether 170 grams of powdered sodium hydroxide were added with vigorous stirring and slight cooling. The temperature increased up to 50° C. After cooling down to 25° C. 195 grams of monochloroacetic acid were slowly added. Care was taken that during the addition the temperature did not surpass 60° C. At the end the mixture was kept at 40–50° C. for a further hour and then the excess of 2-ethylbutylglycol ether distilled off in vacuo. 15% sulphuric acid was then added to the still warm distillation residue whereby the raw 2-ethylbutoxyethoxy-acetic acid was separated, which is a light brown, oily liquid. The pure acid can be obtained by distillation in vauco; B. P. at 12: 169.5 to 171° C. The yield was 90% of the theory.

*Example 2.—Butoxyethoxyethoxyacetic acid*

By using, in Example 1, the same amount of n-butoxy-ethoxyethanol of the formula:

instead of 2-ethylbutylglycol ether and causing the same to react in the same way, as described in Example 1, with sodium hydroxide and monochloroacetic acid the butoxyethoxyethoxyacetic acid, B. P. 15: 195 to 200° C. was obtained in a more than 90% yield.

*Example 3. — Tetrahydrofurfuryloxyacetic acid*

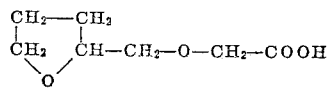

To 3 moles of tetrahydrofurfuryl alcohol were added 2 moles of powdered sodium hydroxide with stirring and moderate cooling. The temperature increased from 20° to 45° C. After cooling down to 20° C. 1 mole of monochloroacetic acid was slowly added whereby care had be taken that the temperature did not exceed 55° C. With a view to complete the reaction, the reaction mixture was stirred for four more hours at a temperature of 40–45° C. and the excess of tetrahydrofurfuryl alcohol was distilled off. The residue was dissolved with 15% sulphuric acid and the oily layer separated by this operation was distilled in vacuo.

The tetrahydrofurfuryloxyacetic acid was obtained in form of a colorless liquid boiling at a pressure of 13 mm. Hg at 178 to 180° C.

*Example 4. — Lauryloxyethoxyethoxyacetic acid*

To 2 moles of lauryldiethylene glycol of the constitution $C_{12}H_{25}OC_2H_4OC_2H_4OH$ there were added 4 moles of finely powdered sodium hydroxide with vigorous stirrring and slight cooling, the temperature having not been allowed to exceed 50° C. Thereupon 2 moles of chloracetic acid were slowly added to the viscous mass at a temperature of 50 to 55° C. with further cooling, and stirring continued for 2 hours at 50 to 55° C. Upon cooling a clear, soft mass was formed consisting of the sodium salt of the lauryloxyethoxyethoxyacetic acid and common salt. The product was very easily soluble in water and formed strongly foaming solutions which showed a marked wetting effect beside being lime-stable. By treating with sulphuric acid the free acid could be obtained.

*Example 5.—1:3 - di - (butoxyethoxy)-propyl-2-oxyacetic acid*

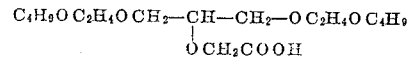

1:3-di-(butoxyethoxy)-2-oxypropane was reacted with sodium hydroxide and chloracetic acid and worked up as described in Example 1. The 1:3-di-(butoxyethoxy)-propyl-2-oxyacetic acid, B. P. 1: 175 to 180° C. was thus obtained.

*Example 6*

To 160 grams of the molten ether obtained by the addition of two moles of ethylene oxide into one mole of technical cetyl alcohol, there were added 22 grams of powdered sodium hydroxide. The whole was mixed keeping the temperature at 40 to 50° C. A turbid and viscous solution was obtained, to which were added 130 grams of the sodium salt of monochloracetic acid, the temperature having been kept at 50–60° C. After all the acid had been added, the mixture was stirred for three hours at 50° C. and one further hour at 75° C.

The excess of the sodium hydroxide was neutralized with sulphuric acid. After cooling, there was obtained a clear, waxy like mass, which was spray-dried. The dried product constituted an easily soluble powder, which can be used as a detergent.

*Example 7*

To 215 grams of the ether of the formula

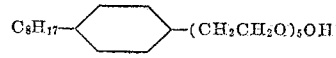

there were stirred in first 25 grams of powdered sodium hydroxide and afterwards 65 grams of the sodium salt of monochloracetic acid, the temperature having been kept at 40 to 50° C. The reaction product was then stirred for two hours at 50° C. and finally for one hour at 70° C. There was obtained a clear, viscous mass, which became turbid as sodium chloride was precipitated. It was clearly soluble in water and its aqueous solutions had good wetting and foaming properties.

What I claim is:

1. A process for the manufacture of polyether derivatives of acetic acid, comprising the step of reacting a compound of the formula

wherein R denotes a hydrocarbon radical, A denotes a member selected from the group consisting of alkylene and alkylene-O-alkylene, the alkylene in each case being lower alkylene, and wherein Me denotes an alkali metal, with a compound of the formula

wherein X denotes halogen and Y means a cation including hydrogen.

2. A process for the manufacture of polyether derivatives of acetic acid, comprising the step of reacting a compound of the formula

wherein R' denotes a hydrocarbon radical containing 12 to 16 carbon atoms, A' denotes a chain of one to five ethenoxy groups and Me means an alkali metal, with a compound of the formula

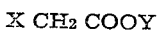

wherein X denotes halogen and Y means a cation including hydrogen.

3. A process for the manufacture of polyether derivatives of acetic acid, comprising the step of reacting a compound of the formula $$C_{12}H_{25}OCH_2CH_2OCH_2CH_2OH \cdot MeOH$$

wherein Me denotes an alkaline metal, with a compound of the formula $$X\ CH_2\ COOY$$

wherein X denotes halogen and Y means a cation including hydrogen.

4. A process for the manufacture of polyether derivatives of acetic acid, comprising the step of reacting a compound of the formula $$C_{16}H_{33}OCH_2CH_2OCH_2CH_2OH \cdot MeOH$$

wherein Me denotes an alkaline metal, with a compound of the formula $$X\ CH_2\ COOY$$

wherein X denotes halogen and Y means a cation including hydrogen.

5. A process for the manufacture of polyether derivatives of acetic acid, comprising the step of reacting a compound of the formula

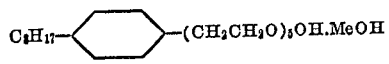

wherein Me denotes an alkaline metal, with a compound of the formula $$X\ CH_2\ COOY$$

wherein X denotes halogen and Y means a cation including hydrogen.

KURT HOFER.

REFERENCES CITED

The following references are of record in the file of this patent:

UNITED STATES PATENTS

| Number | Name | Date |
|---|---|---|
| 554,938 | Lederer | Feb. 18, 1896 |
| 2,068,905 | Bruson | Jan. 26, 1937 |
| 2,083,482 | Steindorff et al. | June 8, 1937 |
| 2,210,874 | Balle et al. | Aug. 13, 1940 |
| 2,333,726 | Leibitz-Piwnicki et al. | Nov. 9, 1943 |
| 2,458,741 | Schmerling | Jan. 11, 1949 |
| 2,474,175 | Weizmann | June 21, 1949 |
| 2,480,817 | Warren | Aug. 30, 1949 |
| 2,490,109 | Weizmann | Dec. 6, 1949 |
| 2,493,126 | Foster et al. | Jan. 3, 1950 |

FOREIGN PATENTS

| Number | Country | Date |
|---|---|---|
| 679,711 | Germany | Aug. 15, 1939 |